Sept. 21, 1948.　　　　　E. W. BRIDGE　　　　　2,449,737
SLICING, CUTTING, AND CORE-REMOVING MACHINE
Filed Oct. 8, 1946　　　　　　　　　　2 Sheets-Sheet 1
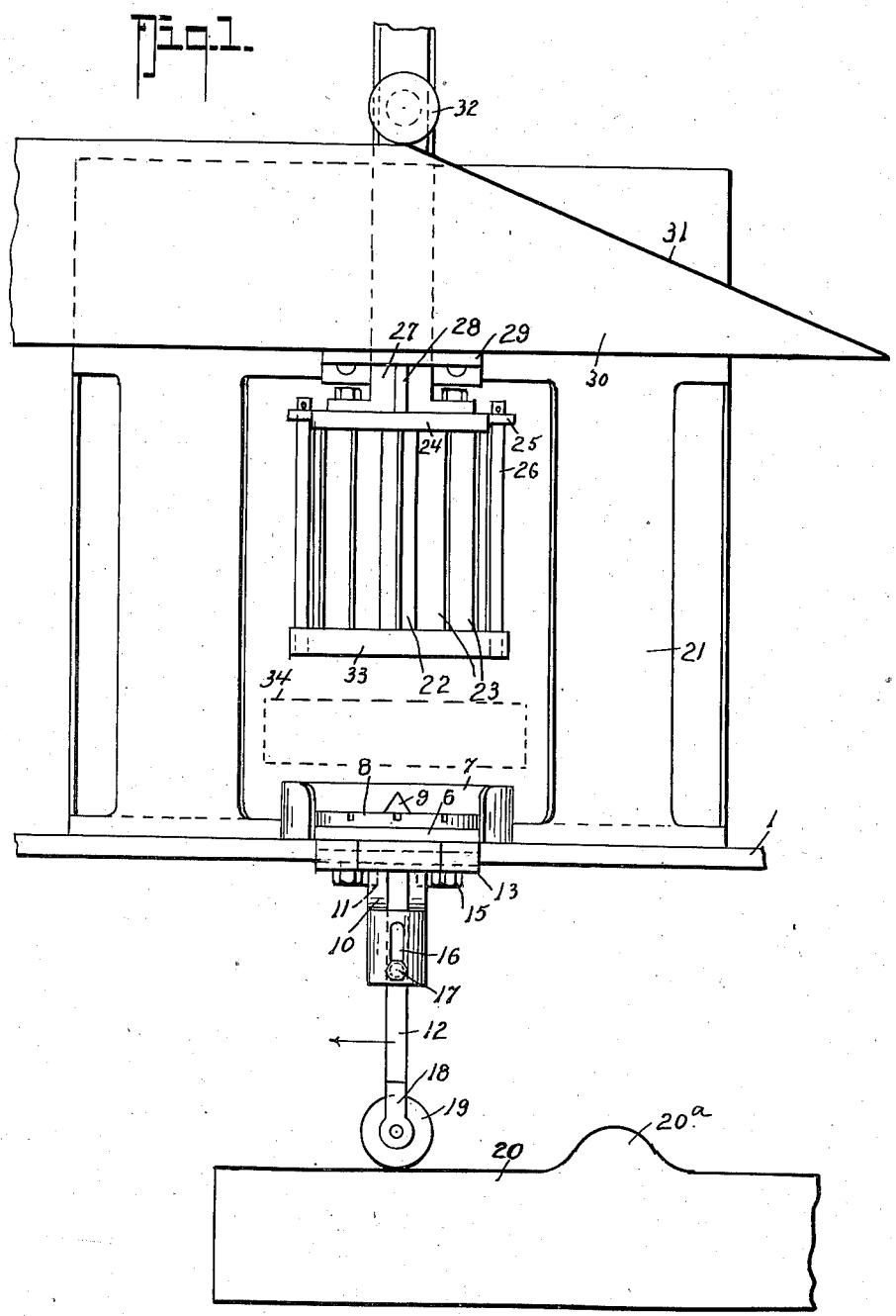
INVENTOR,
Edward W. Bridge,
BY Albert E. Dieterich,
ATTORNEY.

Sept. 21, 1948.  E. W. BRIDGE  2,449,737
SLICING, CUTTING, AND CORE-REMOVING MACHINE
Filed Oct. 8, 1946  2 Sheets-Sheet 2
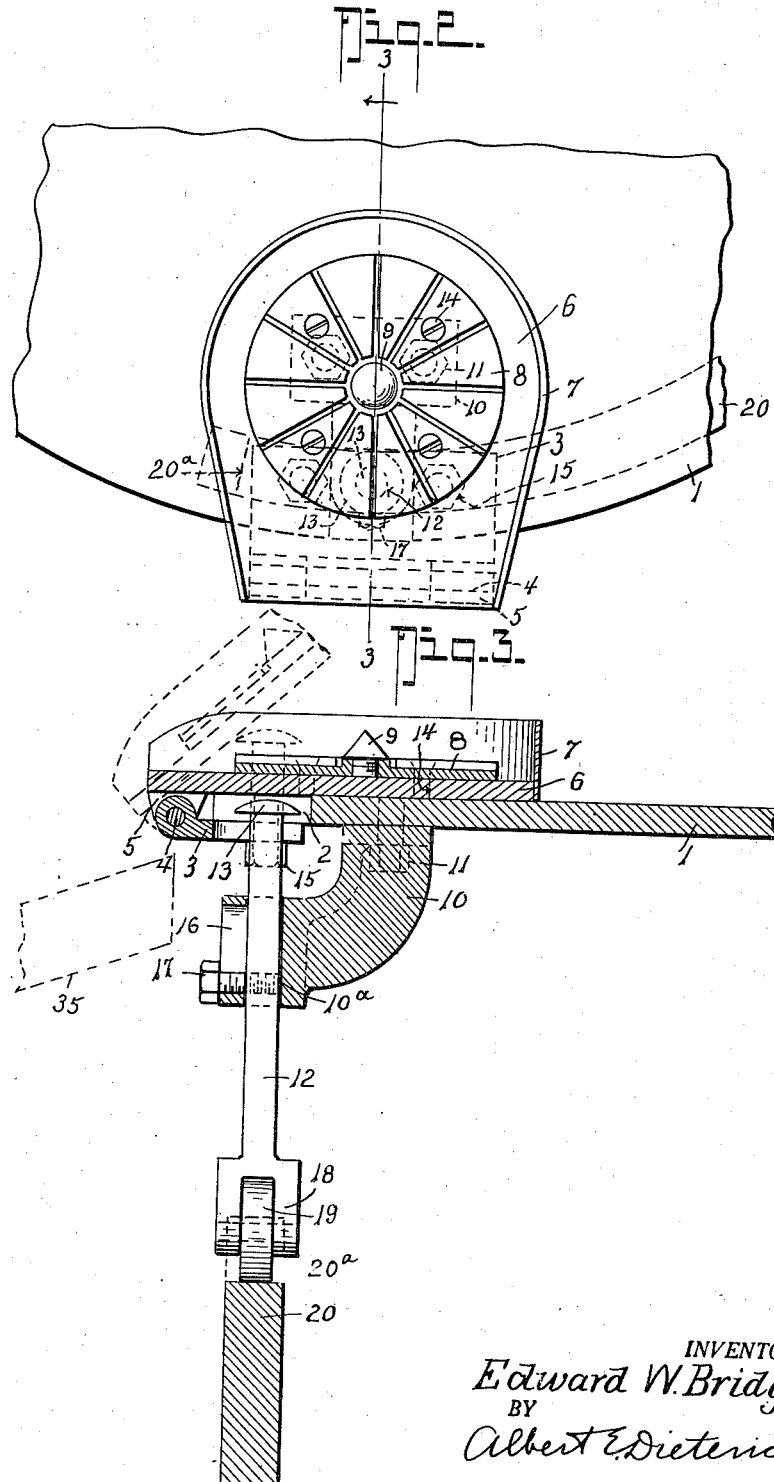
INVENTOR,
Edward W. Bridge,
BY
Albert E. Dieterich.
ATTORNEY.

Patented Sept. 21, 1948

2,449,737

UNITED STATES PATENT OFFICE 2,449,737

SLICING, CUTTING, AND CORE-REMOVING MACHINE

Edward W. Bridge, Philadelphia, Pa.

Application October 8, 1946, Serial No. 701,967

3 Claims. (Cl. 146—42)

My present invention is an improvement on the machine disclosed in my application for patent filed January 7, 1946, Serial No. 639,586 which became Patent No. 2,437,637 on March 9, 1948. In that machine I employ a rotating table (turntable) on which is mounted one or more units each of which includes a receiver for the fruit, a coring and slicing member, a core ejector, means for dumping the slices into an off-take chute, means for ejecting the cores into another off-take chute and cams for actuating the aforesaid parts.

The present invention has for its object to improve the slice dumping part of the machine. In the machine of my application aforesaid a trap-door arrangement was used to drop the slices through a hole in the table. My present invention differs therefrom broadly in using a dump plate in lieu of the trap door and dumping the slices over the outer or peripheral edge of the table.

An object of my invention is to enable a quick dump of the slices and the immediate restoration of the dump plate to its fruit-receiving or normal position by gravity.

Other objects will in part be obvious and in part alluded to hereinafter.

To the attainment of the above objects and ends, invention further resides in the novel details of construction and arrangement of parts, all of which shall be hereinafter fully described and then be specifically pointed out in the accompanying drawings, in which:

Fig. 1 is a side elevation of a portion of a machine embodying my invention.

Fig. 2 is a detail plan view of the parts shown in Fig. 3.

Fig. 3 is a vertical radial section on the line 3—3 of Fig. 2.

In the drawings in which like numerals and letters of reference indicate like parts in all the figures, 1 represents the turntable on which the several units of the machine are mounted.

Secured by cap screws 15 to the under side of the table adjacent its periphery is a radially disposed hinge leaf 3 which is pinned at 4 to hinge lugs 5 on a dump plate to which a die plate 8 and a shield 7 are secured. The shield is secured to the plate in any suitable way. The die plate is removably fastened to the dump plate 6 by countersunk screws 14.

The die plate 8 may be of the same general construction as that of the machine of my application aforesaid and has a removable centering pin 9.

A bracket 10 is secured beneath the table 1 by cap screws 11 and it has a bearing 10ª in which a vertical rod 12 is carried. A screw 17 operating in a slot 16 is attached to the rod to limit its up and down movement. The rod carries a mushroom button 13 on its upper end which works through a slot 2 in the table and hinge to engage the underside of the dump plate 6 when the rod is raised by the hump 20ª of a cam track 20, operating on a roller 19 journalled in a fork 18 at the bottom of the rod.

21 represents the drum of the machine which supports the slicing and coring and core-ejecting devices.

These devices include a backing plate 24 to which the coring-tube-cutter 22 and the radial slicing blades 23 are secured. The plate 24 has ears 25 for the rods 26 which carry a gravity operated slice-hold-down member 33 of suitable construction. A vertical slide or cutting head plunger 27 carries a roller 32 that rides a track cam 30 for raising and lowering the cutting head at proper times, the raising portion of the cam track 30 being indicated by 31.

29 is a bracket that carries the fixed core ejector 28 and the slide-way (not shown) for the plunger 27.

All the parts numbered 21 to 32 inclusive may be of the same construction as corresponding parts disclosed in my application aforesaid.

In the present set-up the cam track 30 is set to raise up the cutting, slicing head far enough so it will not be hit by the dumping plate at the time the dumping action takes place. In Fig. 1 the parts have passed the dumping position and are at the core ejecting position, i. e. the slicing head is fully raised, the trough 35 to receive the core being indicated in dotted lines.

After the fruit on the pin 9 and die plate 8 has been sliced and cored and the cutting head raised sufficiently, plunger 12 is raised by cam node 20ª and plate 6 with its carried parts is tilted to slide off the segments of fruit in a radial direction and deposit them on the trough or chute 35.

From the foregoing description taken with the accompanying drawings it is thought the construction, operation and advantages of my improvements will be clear.

What I claim is:

1. In a fruit slicing and coring machine wherein is provided a turntable on which the operating units are mounted, the improvement which comprises a dump plate hinged to the turntable at its periphery and normally resting on the top of the table, a die plate mounted on said dump plate, a shield around the dump plate and open at the hinge side of the same for discharge of cuttings on said die plate, and cam operated means separate from the dump plate hinge but engaging the plate for raising said dump plate to dump the cuttings over the periphery of the turntable.

2. The improvement according to claim 1 wherein the dump plate raising means comprises a bracket secured to the turntable, a plunger operatively mounted on said bracket and projecting through a hole in the table for engaging the underside of said dump plate, and a cam track with a hump along which said plunger rides.

3. The improvement according to claim 1 wherein the means for raising the dump plate comprises a bracket secured to the underside of the turntable and having a bearing, a rod movable in said bearing and having a cam-track-riding roller at its lower end and a mushroom button at its upper end, the table having a hole through which said button is operable to engage and lift said dump plate, and a cam track with a hump on which said roller rides.

EDWARD W. BRIDGE.

REFERENCES CITED

The following references are of record in the file of this patent:

UNITED STATES PATENTS

| Number | Name | Date |
| --- | --- | --- |
| 1,077,446 | Wolfe | Nov. 4, 1913 |
| 1,610,236 | Ayars | Dec. 14, 1926 |
| 1,992,688 | Bonvallet | Feb. 26, 1935 |
| 2,015,666 | Ewald | Oct. 1, 1935 |
| 2,297,177 | Tiffany | Sept. 29, 1942 |